United States Patent [19]

Miyauchi et al.

[11] Patent Number: 5,801,135

[45] Date of Patent: Sep. 1, 1998

[54] DEINKING COMPOSITION COMPRISING A FATTY ACID MIXTURE AND A NONIONIC SURFACTANT

[75] Inventors: Yoshitaka Miyauchi; Toshiki Sowa; Koji Hamaguchi; Daisuke Shiba; Hiromichi Takahashi, all of Wakayama, Japan

[73] Assignee: Kao Corporation, Tokyo, Japan

[21] Appl. No.: 542,419

[22] Filed: Oct. 12, 1995

[30] Foreign Application Priority Data

Oct. 20, 1994 [JP] Japan ..................... 6-255524

[51] Int. Cl.$^6$ ..................... C11D 1/04; C11D 1/722; C11D 1/83
[52] U.S. Cl. ..................... 510/474; 510/421; 510/422; 510/488; 510/499; 162/4; 162/5; 162/6
[58] Field of Search ..................... 162/4, 5, 6; 510/174, 510/421, 422, 488, 499

[56] References Cited

U.S. PATENT DOCUMENTS

| | | | |
|---|---|---|---|
| 4,483,742 | 11/1984 | Bridle | 162/5 |
| 4,964,949 | 10/1990 | Hamaguchi et al. | 162/5 |
| 5,200,034 | 4/1993 | Richmann et al. | 162/5 |
| 5,254,290 | 10/1993 | Blandiaux et al. | 252/545 |
| 5,282,928 | 2/1994 | Takahashi et al. | 162/5 |
| 5,302,243 | 4/1994 | Ishibashi et al. | 162/5 |
| 5,411,674 | 5/1995 | Tagata et al. | 252/117 |
| 5,417,807 | 5/1995 | Fossas et al. | 162/5 |

FOREIGN PATENT DOCUMENTS

| | | |
|---|---|---|
| 307024 | 8/1988 | European Pat. Off. |
| 0307024 | 3/1989 | European Pat. Off. |
| 492507 | 12/1990 | European Pat. Off. |
| 138332 | 8/1982 | Japan |
| 191834 | 8/1986 | Japan |
| 717195 | 2/1980 | U.S.S.R. |

OTHER PUBLICATIONS

McCutcheon's Emulsifiers & Detergents 1982 (No Month Available).

Database WPI Section Ch, Week 8748 Derwent Publication Ltd., AN 87–338768 corresponding to JP-A-62 243 892; Oct. 24, 1987.

Database WPI Section Ch, Week 9024 Derwent Publication Ltd., AN 90–181530 corresponding to JP-A-02 117 996; May 2, 1990.

"Colloid and Interface Chemistry", p. 8, Robert D. Vold et al., San Diego, California, 1983.

Primary Examiner—Paul Lieberman
Assistant Examiner—Charles Boyer
Attorney, Agent, or Firm—Birch, Stewart, Kolasch & Birch, LLP

[57] ABSTRACT

A liquid deinking composition comprising (a) a fatty acid mixture containing 40 to 90 weight % of saturated fatty acids having 12 to 14 carbon atoms and less than 60 weight % of saturated fatty acids having 16 to 18 carbon atoms, (b) a nonionic surfactant with HLB of 2 to 12 in a proportion of (a)/(b)=5/95 to 40/60 (weight ratio), and (c) 0 to 20 weight % (based on the composition) of water.

No crystals of fatty acids are precipitated at ambient temperatures, and the separation, solidification or precipitation of crystals due to a temperature change is not caused. Further, the handling property is improved because of the liquid form.

17 Claims, No Drawings

5,801,135

DEINKING COMPOSITION COMPRISING A FATTY ACID MIXTURE AND A NONIONIC SURFACTANT

FIELD OF THE INVENTION

The present invention relates to a deinking composition used in recycling waste papers such as newspapers and magazines, more specifically to a deinking composition which can provide a high quality deinked pulp having a high brightness and a low residual ink in a deinking treatment of waste papers by floatation and a floatation/washing combination system.

DESCRIPTION OF THE RELATED ART

There have so far been used as a deinking agent singly or in combination of two or more kinds, anionic surfactants such as alkylbenezenesulfonates, higher alcohol sulfates, α-olefinsulfonates, and dialkylsulfosuccinates, nonionic surfactants such as ethylene oxide adducts of higher alcohols, ethylene oxide adducts of alkylphenols, ethylene oxide adducts of fatty acids, and alkanolamides.

However, a change in the deinking process described above allows fatty acid soaps or fatty acids (which become soaps due to alkali agents contained in a system), which are the best ink aggregators and have good defoaming properties to be considered again.

The combinations of saturated fatty acid soaps or saturated fatty acids with ink releasing agents or foaming agents are disclosed as a technique using fatty acid soaps or fatty acids in JP-A-62-250291, which emphasized an increase of ink releasing and aggregating properties attributable to the combined use or blends of fatty acids and alkylene adducts of alcohols.

However, no descriptions are found in these techniques regarding the forms of the blends, and mere mixing of saturated fatty acids such as solid stearic acid commercially available in the market causes fatty acids to precipitate and separate at ambient temperatures. Further, in case of the combined use thereof, the solidity of fatty acids at ambient temperatures deteriorates the handling thereof, and when they are brought into an actual use, specific additional facilities including equipment for heating to 50° C. or higher or equipment for producing soaps is required. Thus, previous techniques have the disadvantages that a lot of energy is consumed, handling is inferior and the presence of fatty acids in a deinking system in the form of lumps due to uneven mixing causes the fatty acids to remain also in recycled papers and brings about a reduction in a deinking performance.

As disclosed in U.S. Pat. Nos. 4,586,982 and 4,959,123, it is known that the disadvantages described above can be improved by oil-water (O/W) emulsions of fatty acids prepared by using fatty acids in combination with nonionic surfactants or anionic surfactants. However, even these methods have not been able to solve sufficiently the disadvantages of saturated fatty acids, and problems have related to stability and recoverability of emulsions due to a temperature change have been realized. Further, there have been problems that emulsifying equipment is required and transportation cost is increased because of low ingredient concentration.

SUMMARY OF THE INVENTION

The present inventors have made intensive researches for a purpose to obtain a deinking composition having improved operating performance by turning a product form to a liquid without damaging the excellent ink aggregating property, ink releasing property and defoaming property which are the characteristics of saturated fatty acids and which enhance the quality of recycled pulps obtained after deinking. As a result thereof, the present inventors have found that a liquid composition prepared by dissolving a fatty acid mixture containing saturated fatty acid having 12 to 14 carbon atoms as an essential component in a nonionic surfactant can achieve the object described above, and have come to complete the present invention.

That is, the present invention provides a liquid deinking composition comprising (a) a fatty acid mixture containing 40 to 90 weight % of saturated fatty acids having 12 to 14 carbon atoms and at most 60 weight % of saturated fatty acids having 16 to 18 carbon atoms, (b) a nonionic surfactant with HLB of 2 to 12 in a proportion of (a)/(b)=5/95 to 40/60 (weight ratio), and (c) 0 to 20 weight % (based on the composition) of water, and a method for deinking waste paper with the composition as defined in claim 1.

The liquid deinking composition described above contains preferably the fatty acid mixture containing 5 to 50 weight % of saturated fatty acid having 16 to 18 carbon atoms.

DETAILED DESCRIPTION OF THE INVENTION

In the present invention the fatty acid mixture containing saturated fatty acids with total of 12 to 14 carbon atoms, having an ink aggregating function and a defoaming function, such as lauric acid and myristic acid, is used as an essential component. It is difficult to balance liquefaction with deinking performance using only fatty acids other than the saturated fatty acids having 12 to 14 carbon atoms. The proportion of the saturated fatty acids having 12 to 14 carbon atoms in the fatty acid mixture described above is 40 to 90 weight %, preferably 50 to 90 weight %, and more preferably 60 to 90 weight %. The proportion of the satulated fatty acids having 16 to 18 carbon atoms is 60 weight % or less, preferably 5 to 50 weight %, and more preferably 5 to 20 weight %.

The fatty acid mixture used in the present invention may contain fatty acids other than the fatty acids having 12 to 14 carbon atoms and the fatty acids having 16 to 18 carbon atoms as long as the effects desired in the present invention are not damaged. For example, the fatty acid mixture may include fatty acids having 8 to 10 carbon atoms and 20 to 24 carbon atoms, and in particular, caprylic acid, capric acid, and behenic acid.

The fatty acid mixture of the present invention has a titre (melting point; JIS K-0065) falling in a range of 10° to 50° C., preferably 20° to 45° C. The fatty acid mixture may contain unsaturated fatty acids, polymer fatty acids, and resin acids as long as the titre falls in the range described above.

In the present invention, nonionic surfactants which have an ink releasing function and are recognized as a deinking agent are used. Preferred as the nonionic surfactant are compounds obtained by the random-addition reaction and/or block-addition reaction of an alkylene oxide having 2 to 4 carbon atoms to alcohols, amines or fatty acids each having hydrogens activated for additions, or fatty esters thereof. The following compounds are exemplary:

(1) Alkylene oxide adducts of saturated or unsaturated, primary or secondary alcohols having 8 to 24 carbon atoms, or alkylene oxide adducts of alkylphenols having total 8 to 12 carbon atoms in the alkyl moiety:

Constitutional alcohols include preferably myristyl alcohol, cetyl alcohol and stearyl alcohol. Alkylene oxides (hereinafter abbreviated as AO) added to alcohols include ethylene oxide (hereinafter abbreviated as EO), propylene oxide (hereinafter abbreviated as PO), and butylene oxide. In particular, EO is preferably contained as an essential component. The addition molar number of AO is 3 to 200 moles, preferably 10 to 80 moles per 1 mole of alcohol or alkylphenol. In particular, the nonionic surfactant which has a good ink releasing property and the solution of which is readily prepared can be obtained in this range. The addition form may be either random addition or block addition.

(2) AO adducts of saturated or unsaturated higher fatty acids having 10 to 24 carbon atoms:

Among the higher fatty acids, the saturated fatty acids include lauric acid, myristic acid, palmitic acid, stearic acid, arachic acid, and behenic acid. The unsaturated fatty acids include palmitoleic acid, oleic acid, elaidic acid, linoleic acid, linolenic acid, erucic acid, and ricinolic acid. The kind and addition molar number of AO are the same as those described above.

(3) AO adducts of saturated or unsaturated, primary or secondary amines:

The amines include 2-ethylhexylamine, di-2-ethylhexylamine, laurylamine, dilaurylamine, tetradecylamine, ditetradecylamine, hexadecylamine, dihexadecylamine, stearylamine, distearylamine, oleylamine, and dioleylamine. The kind and addition molar number of AO are the same as those described above.

(4) AO adducts of the mixtures of polyhydric alcohols having 2 to 10 hydroxyls and oil & fats in which the saturated or unsaturated fatty acid moiety has 8 to 24 carbon atoms:

The fatty acids include the compounds given in (2) described above. The polyhydric alcohols having 2 to 10 hydroxyls include ethylene glycol, propylene glycol, glycerine, polyglycerine, sorbitol, sorbitan, and sucrose. The kind and addition molar number of AO are the same as those described above.

Nonionic surfactants other than those described above can be used if they have characters suitable as a deinking agent. The nonionic surfactant has a HLB according to Mr. Davies (Robert D. Vold et al., COLLOID AND INTERFACE CHEMISTRY(1983), J. T. Davies, Proc. 2nd Int. Congr. Surface Activity, 1, 426(1957)), which falls preferably in a range of 2 to 12, particularly 3 to 10.

In the present invention, the suitable ratio of (a) the fatty acid mixture to (b) the nonionic surfactant falls in a range of (a)/(b)=5/95 to 40/60, preferably 10/90 to 30/70 in terms of a weight ratio. An increase in the fatty acid mixture from this range causes the fatty acids to solidify and separate, and makes liquefaction difficult, and produces a tendency to lower the ink release property of the composition. A decrease in the amount of the fatty acid mixture from the above range deteriorates the ink aggregating property and the defoaming property of the composition.

In preparing a liquid composition which is the deinking composition for recycling waste papers according to the present invention, the addition of water can expedite the dissolution of the fatty acid mixture. However, an excess amount of water causes the liquid composition to increase in the viscosity or solidify in some cases. The amount of water is required to be 20 weight % or less, preferably 5 to 20 weight % based on the weight of the liquid composition to give good performance.

The deinking composition for recycling waste papers according to the present invention comprises the liquid composition prepared by dissolving the component (a) described above in the component (b). The production method thereof is not restricted. In general, a method is employed in which after the respective components are charged in one lot and mixed by once heating higher than the melting point of the fatty acid mixture of the component (a) to sufficiently dissolve the fatty acids, then the mixture is cooled down close to ordinary temperatures. The deinking composition of the present invention has no crystals of fatty acids precipitated at ordinary temperatures and does not separate, solidify or precipitate crystals due to a change in temperature.

The liquid composition which is the deinking composition of the present invention preferably has a liquefaction index falling in a range of 0.8 to 1.2, more preferably 0.9 to 1.1. Here, the "liquefaction index" is calculated in the following manner.

First, a liquid composition is prepared by dissolving a fatty acid mixture in a nonionic surfactant and charged into a suitable cylindrical vessel. After leaving it for standing at ordinary temperatures for a fixed period, 1/10 (based on volume) of the liquid at the upper part of the liquid at the lower part are collected, and the respective acid values (JIS K-3504) are measured. A ratio of [the acid value at the upper part]/[the acid value at the lower part] is determined from the above values and defined as the liquefaction index. The liquefaction index closer to 1 means that the liquid composition resides in a more even dissolution (dispersion in some cases) state.

The deinking composition for recycling waste papers according to the present invention may be added in one or more of a pulping process, a kneading process, a soaking process, and a flotation process, or in each of the steps. The highest deinking effect can be expected when it is added to a process having a high shearing force such as a pulping process and a kneading process. The amount of the composition added is preferably 0.05 to 1.0 weight % based on a raw material waste paper.

The deinking composition of the present invention can be used, if necessary, in combination with known deinking agents which have so far been conventionally used, for example, higher alcohol sulfates, polyoxyalkylene higher alcohol sulfates, and alkylbenezenesulfonates.

The composition of the present invention has an excellent liquefying property, and the following crystallization inhibitors, such as a polyhydric alcohol fatty ester can be added to control crystal precipitation in more severe conditions.

Polyhydric alcohol constituting the polyhydric alcohol fatty ester includes ethylene glycol, propylene glycol, glycerine, polyglycerine, sorbitol, sorbitan, and sucrose. The fatty acid constituting the same includes saturated fatty acids having 12 to 22 carbon atoms, unsaturated fatty acids having 16 to 22 carbon atoms, and a mixture thereof in an optional proportion. Among the fatty acids, the saturated fatty acids include lauric acid, myristic acid, palmitic acid, stearic acid, arachic acid, and behenic acid. The unsaturated fatty acids include palmitoleic acid, oleic acid, elaidic acid, linoleic acid, linolenic acid, erucic acid, and ricinolic acid.

In particular, a polyhydric alcohol portion of the polyhydric alcohol fatty acid ester is preferably glycerine, diglycerine, or polyglycerine (polyglycerine having 6 to 30 carbon atoms) having an average polymerization degree, which is calculated from a hydroxyl group value, of 2 to 12, preferably 4 to 10. The fatty acid constituting the polyhydric alcohol fatty acid ester is preferably saturated or (poly) unsaturated fatty acid having total 10 to 24 carbon atoms, and mixed fatty acids rather than single fatty acid are preferably used. More preferably used is the mixture of unsaturated fatty acids such as oleic acid and linolenic acid with saturated fatty acids containing palmitic acid and stearic acid as the essential components.

The polyhydric alcohol fatty acid ester has an esterification degree of 30 to 100%, preferably 60 to 100%.

The crystallization inhibitor can be added in an amount of 0.05 to 20 weight % based on the total amount of the deinking composition.

The crystallization inhibitor is preferably an ester of glycerine, diglycerine, or polyglycerine having 6 to 30 carbon atoms with saturated fatty acid having 12 to 22 carbon atoms or unsaturated fatty acid having 16 to 22 carbon atoms.

The deinking composition for recycling waste papers according to the present invention has an excellent capability to remove inks released from news papers, magazines, wood free waste papers, office automation waste papers, and various waste papers printed with an offset ink, a letter press ink, and a toner ink and enables one to obtain a high quality pulp having a high brightness and a low residual ink. The above deinking composition has excellent characteristics that it does not cause foaming trouble in a deinking step because it has an excellent defoaming property and further, because of the liquid product form thereof at ambient temperatures, it is excellent in handling as compared with a case where saturated fatty acids are used as they are and that it does not require specific adding facilities and heating facilities and enables stable operation.

EXAMPLES

The present invention will be explained below with reference to examples, but the present invention will not be limited to these examples.

Example 1

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
$RO(EO)_{20}(PO)_{20}H$ [$R=C_{16}/C_{18}$ (20/80%) HLB=4.1]
Deionized water: 10 weight %

Example 2

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
$RCOO(EO)_{25}(PO)_{10}H$ [R=fatty acid residue of $C_{18}/C_{18F1}$ (20/80%), HLB=8.7]
Deionized water: 10 weight %

Example 3

Fatty acid mixture: 20 weight %
$C_{10}/C_{12}/C_{14}/C_{16}/C_{18}$
(1/57/22/10/3%)
Nonionic surfactant: 70 weight %
$RCOO(EO)_{25}(PO)_{10}H$ [R=fatty acid residue of $C_{18}/C_{18F1}$ (20/80%), HLB=8.7]

Comparative Example 1

Fatty acid $C_{18}$ (100%): 20 weight %
Nonionic surfactant: 70 weight %
$RO(EO)_{20}(PO)_{20}H$ [$R=C_{16}/C_{18}$ (20/80%) HLB=4.1]
Deionized water: 10 weight %

Comparative Example 2

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
$RO(PO)_5(EO)_5(PO)_5H$ [$R=C_{16}/C_{18}$ (20/80%) HLB=0.7]
Deionized water: 10 weight %

Comparative Example 3

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
$RCOO(EO)_{40}H$ [R=fatty acid residue of $C_{18}/C_{18F1}$ (20/80%), HLB=15.1]
Deionized water: 10 weight %

Comparative Example 4

Fatty acid $C_{12}$ (100%): 20 weight %
Nonionic surfactant: 70 weight %
$RCOO(EO)_{25}(PO)_{10}H$ [R=fatty acid residue of $C_{18}/C_{18F1}$ (20/80%), HLB=8.7]
Deionized water: 10 weight %

Comparative Example 5 unsatulated fatty acid $C_{18F1}$ (100%): 20 weight %
Nonionic surfactant: 70 weight %
$RO(EO)_{20}(PO)_{20}H$ [$R=C_{16}/C_{18}$ (20/80%) HLB=4.1]
Deionized water: 10 weight %

Comparative Example 6

Fatty acid mixture $C_{16}/C_{18}$ (20/80%): 20 weight %
Glycerine monostearyl ester: 2 weight %
α-olefinsulfonate: 0.5 weight %
Deionized water: 77.5 weight %

In the respective examples described above, "$C_n$" means saturated fatty acid having n carbon atoms; "$C_{nF1}$" means unsaturated fatty acid having n carbon atoms and one unsaturated bond; and "$C_{nF2}$" means unsaturated fatty acid having n carbon atoms and two unsaturated bonds.

(Production of deinking composition)

The deinking compositions of Examples 1 to 3 and Comparative Examples 1 to 5 were prepared by charging the components described above in one lot, dissolving them evenly with a DC stirrer having two blades while elevating the temperature up to about 60° C., then cooling the solutions down to about 30° C. while continuing stirring.

The deinking composition of Comparative Example 6 was prepared by charging the components described above in one lot homogenizing them to an emulsion with a DC stirrer having two blades while elevating the temperature up to about 80° C., then cooling the emulsion down to about 30° C. while continuing stirring. The deinking composition of Comparative Example 6 was of an emulsion form.

(Evaluation of deinking composition)

In order to evaluate a preservability, a standing stability and a recoverability of the deinking compositions, the following tests were performed.

(1) Standing stability

A sample was put in an incubator at each temperature shown in Table 1 in a standing state to evaluate a stability of the sample after 24 hours. The results thereof are shown in Table 1. The marks shown in the table have the following meanings:

No change in a liquid: ⊙
Precipitation of crystals: Δ
Solidification or separation: x

TABLE 1

|  | Standing stability | | | Liquefaction index | | |
| --- | --- | --- | --- | --- | --- | --- |
|  | 10° C. | 20° C. | 30° C. | 10° C. | 20° C. | 30° C. |
| Example 1 | ⊙ | ⊙ | ⊙ | 1.00 | 1.00 | 1.00 |
| Example 2 | ⊙ | ⊙ | ⊙ | 1.00 | 1.00 | 1.00 |
| Example 3 | ⊙ | ⊙ | ⊙ | 1.00 | 1.00 | 1.00 |
| Comp. Example 1 | x | Δ | Δ | 1.35 | 1.81 | 1.50 |
| Comp. Example 2 | x | Δ | ⊙ | 1.38 | 1.62 | 1.01 |
| Comp. Example 3 | x | Δ | ⊙ | 1.44 | 1.65 | 1.02 |
| Comp. Example 4 | x | Δ | Δ | 1.63 | 1.38 | 1.06 |
| Comp. Example 5 | ⊙ | ⊙ | ⊙ | 1.00 | 1.00 | 1.00 |
| Comp. Example 6 | Δ | Δ | Δ | 1.00 | 1.00 | 1.00 |

(2) Recoverability

Low temperature: after leaving the sample standing in the incubator of −5° C. for 24 hours, the recoverability of the form of the sample was evaluated after leaving the sample for standing in an incubator at 30° C. for 24 hours.

High temperature: after leaving the sample standing in an incubator at 60° C. for 24 hours, the recoverability of the form of the sample was evaluated after leaving the sample standing in an incubator at 30° C. for 24 hours.

These results thereof are shown in Table 2. The marks shown in the table have the following meanings:
No change in a liquid: ⊙
Precipitation of crystals: Δ
Solidification or separation: x

TABLE 2

|  | Recoverability | | Liquefaction index | |
| --- | --- | --- | --- | --- |
|  | Low temp. | High temp. | Low temp. | High temp. |
| Example 1 | ⊙ | ⊙ | 1.00 | 1.00 |
| Example 2 | ⊙ | ⊙ | 1.00 | 1.00 |
| Example 3 | ⊙ | ⊙ | 1.00 | 1.00 |
| Comp. Example 1 | x | Δ | 1.42 | 1.35 |
| Comp. Example 2 | Δ | ⊙ | 1.31 | 1.01 |
| Comp. Example 3 | x | Δ | 1.39 | 1.02 |
| Comp. Example 4 | x | Δ | 1.64 | 1.06 |
| Comp. Example 5 | ⊙ | ⊙ | 1.00 | 1.00 |
| Comp. Example 6 | x | x | 1.89 | 1.10 |

(Results)

It can be found that in Examples 1 to 3 and Comparative Example 5, the liquefaction indices fall within a range of 0.8 to 1.2 and a dissolved state remains stable even if the temperature changes.

In Comparative Examples 1 to 4, the liquefaction index deviates from the above range, and crystals are precipitated at ambient temperatures. In Comparative Example 6, standing stability is high in an emulsion state but it becomes markedly instable upon a change in temperature.

(3) Deinking performance

The deinking compositions obtained above were used to carry out the following deinking test to compare deinking performances.

Raw material waste papers (newspapers/leaflets=75/25) were slit to 2×5 cm and then charged into a bench dissociator. Added thereto were 1% (based on the raw material) of caustic soda, 3% (based on the raw material) of sodium silicate, 3% (based on the raw material) of 30% hydrogen peroxide, 0.4% (based on the raw material) of the deinking composition in terms of effective ingredients, and water, and waste papers were dissociated at 40° C. for 10 minutes in a pulp concentration of 5%. After soaking at 40° C. for 60 minutes, water was added to adjust the pulp concentration to 1%, and a flotation was carried out at 30° C. for 10 minutes. After finishing the flotation, the pulp slurry was concentrated to 10%, and water was then added again to reduce the concentration to 1%. A pulp sheet was produced on a tapping sheet machine and dried by blowing wind.

A brightness and a residual ink area ratio of the pulp sheet thus obtained were measured. Residual fatty acid (soap) was observed. The brightness was determined with a color-difference meter, and the residual ink area ratio (%) was determined with an image analysis equipment (× 100 magnifications). The results thereof are shown in Table 3.

In Comparative Example 7 in Table 3, assuming conventional adding equipment, fatty acid was added in a solid form (flake form) in the procedure of Comparative Example 1, and a deinking treatment was carried out in the same manner as that described above.

TABLE 3

|  | Quality of deinked pulp | | |
| --- | --- | --- | --- |
|  | Brightness (%) | Residual ink area ratio (%) | Residual fatty acid |
| Example 1 | 52.9 | 0.065 | None |
| Example 2 | 52.6 | 0.071 | None |
| Example 3 | 52.7 | 0.068 | None |
| Comp. Example 1 | 52.5 | 0.084 | None |
| Comp. Example 2 | 49.9 | 0.362 | None |
| Comp. Example 3 | 50.7 | 0.269 | None |
| Comp. Example 4 | 51.6 | 0.124 | None |
| Comp. Example 5 | 48.4 | 0.452 | None |
| Comp. Example 6 | 51.7 | 0.179 | None |
| Comp. Example 7 | 50.1 | 0.201 | Present |

(Results)

In Examples 1 to 3 and Comparative Example 1, the ink aggregating property and the ink releasing property are good, and the deinking performance is excellent. However, since in Comparative Example 1, the stability and the recoverability are inferior as shown in Tables 1 and 2, that composition is not practicable. In Comparative Examples 2 and 5, since the ink aggregating property is insufficient in the flotation cell, and the foaming property is small, the ink removability is bad, and the deinking performance is inferior. In Comparative Examples 3, 4 and 6, since the ink releasing property is bad, a lot of ink remains, and the deinking performance is therefore inferior. Further, in Comparative Example 7 (conventional method), since fatty acid (soap) remains to the last and is not mixed well in the system, the deinking performance is inferior. Examples 4 to 12 and Comparative Examples 8 and 9

The deinking compositions were prepared in the compositions shown below in the same manner as those in Examples 1 to 3 and evaluated in the same manner as those in Examples 1 to 3. The results thereof are shown in Tables 4 to 6.

Comparative Example 8

Fatty acid mixture: 20 weight %
$C_{16F1}/C_{18F1}/C_{18F2}/C_{20F1}$
(1/83/10/6%)
Nonionic surfactant: 70 weight %
$RO(EO)_{20}(PO)_{20}H$ [R=$C_{16}/C_{18}$ (20/80%) HLB=4.1]
Deionized water: 10 weight %

Comparative Example 9

Fatty acid $C_{18F1}$ (100%): 20 weight %
Nonionic surfactant: 70 weight %
$RCOO(EO)_{25}(PO)_{10}H$ [R=fatty acid residue of $C_{18}/C_{18F1}$ (20/80%), HLB=8.7]
Deionized water: 10 weight %

Example 4

Fatty acid mixture: 30 weight %
$C_{10}/C_{12}/C_{14}/C_{16}/C_{18}$
(1/57/22/10/3%)
Nonionic surfactant: 70 weight %
$RCOO(EO)_{25}(PO)_{10}H$ [R=fatty acid residue of $C_{18}/C_{18F1}$ (20/80%), HLB=8.7]

Example 5

Fatty acid mixture: 30 weight %
$C_{10}/C_{12}/C_{14}/C_{16}/C_{18}$
(1/57/22/10/3%)
Nonionic surfactant: 70 weight %
$RCOO(EO)_{25}(PO)_{10}H$ [R=fatty acid residue of $C_{18}/C_{18F1}$ (20/80%), HLB=8.7]

Example 6

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
$R_1O(EO)_{17}(PO)_8OCR_2$ [$R_1$=secondary alcohol residue of $C_{12}$ to $C_{14}$, $R_2$=fatty acid residue of $C_{10}$, HLB=2.9]
Deionized water: 10 weight %

Example 7

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
random adduct of EO 20 moles and PO 10 moles to nonylphenol [HLB=6.9]
Deionized water: 10 weight %

Example 8

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
alkylamine-alkylene oxide adduct represented by the following formula:

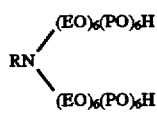

[R=/$C_{14}/C_{16}/C_{18}$ (4/30/66%), HLB=11.6]
Deionized water: 10 weight %

Example 9

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
alkylene oxide random adduct of castor oil/glycerine (1/1 mole ratio) (EO=60 moles, PO=40 moles, HLB=9.0)
Deionized water: 10 weight %

Example 10

Fatty acid mixture: 20 weight %
$C_{10}/C_{12}/C_{14}/C_{16}/C_{18}/C_{18F1}/C_{18F2}$
(1/46/37/8/2/5/1%)
Nonionic surfactant: 70 weight %
alkylene oxide random adduct of beef tallow/sorbitol (1/0.5 mole ratio) (EO=70 moles, PO=40 moles, HLB=6.0)
Deionized water: 10 weight %

Example 11

The same composition as that in Example 1 was used, except that the following compound was substituted for the nonionic surfactant used in Example 1:

$RO(PO)_5(EO/PO)_{(15/10)}(EO)_5(PO)_5H$ [R=$C_{18}$, HLB=4.0]

Example 12

The same composition as that in Example 5 was used, except that the following compound was substituted for the nonionic surfactant used in Example 5:

$RCOO(PO)_2(EO/PO)_{(20/10)}(EO)_5(PO)_3H$ [R=fatty acid residue of $C_{18}/C_{18F1}$ (20/80%), HLB=8.0]

Example 13

Fatty acid mixture: 25 weight %
$C_{14}/C_{16}/C_{18}$ (50/25/25%)
Nonionic surfactant: 65 weight %
$RO(EO)_{20}(PO)_{20}H$ [an average carbon number of R: 18, HLB=4.0]
Crystallization inhibitor: 0.5 weight %
hexaglycerine fatty acid tetraester
$C_{16}/C_{18}/C_{18F1}$ (35/55/10%)
Deionized water: 9.5 weight %

TABLE 4

| | Standing stability | | | Liquefaction index | | |
|---|---|---|---|---|---|---|
| | 10° C. | 20° C. | 30° C. | 10° C. | 20° C. | 30° C. |
| Comp. Example 8 | ⊙ | ⊙ | ⊙ | 1.00 | 1.00 | 1.00 |
| Comp. Example 9 | ⊙ | ⊙ | ⊙ | 1.00 | 1.00 | 1.00 |
| Example 4 | △ | ⊙ | ⊙ | 1.42 | 1.10 | 1.01 |
| Example 5 | ⊙ | ⊙ | ⊙ | 1.00 | 1.01 | 1.00 |
| Example 6 | ⊙ | ⊙ | ⊙ | 1.01 | 1.00 | 1.01 |
| Example 7 | ⊙ | ⊙ | ⊙ | 1.00 | 1.00 | 1.00 |
| Example 8 | ⊙ | ⊙ | ⊙ | 1.03 | 1.00 | 1.00 |
| Example 9 | ⊙ | ⊙ | ⊙ | 1.10 | 1.02 | 1.00 |
| Example 10 | ⊙ | ⊙ | ⊙ | 1.07 | 1.01 | 1.00 |
| Example 11 | ⊙ | ⊙ | ⊙ | 1.00 | 1.00 | 1.01 |
| Example 12 | ⊙ | ⊙ | ⊙ | 1.00 | 1.01 | 1.01 |
| Example 13 | ⊙ | ⊙ | ⊙ | 1.00 | 1.01 | 1.00 |

TABLE 5

| | Recoverability | | Liquefaction index | |
|---|---|---|---|---|
| | Low temp. | High temp. | Low temp. | High temp. |
| Comp. Example 8 | ⊙ | ⊙ | 1.00 | 1.02 |
| Comp. Example 9 | ⊙ | ⊙ | 1.01 | 1.00 |
| Example 4 | △ | ⊙ | 1.12 | 1.00 |
| Example 5 | ⊚ | ⊚ | 1.00 | 1.00 |
| Example 6 | ⊚ | ⊚ | 1.04 | 1.00 |
| Example 7 | ⊚ | ⊚ | 1.00 | 1.00 |
| Example 8 | ⊚ | ⊚ | 1.06 | 1.00 |
| Example 9 | ⊚ | ⊚ | 1.00 | 1.00 |
| Example 10 | ⊚ | ⊚ | 1.03 | 1.00 |
| Example 11 | ⊚ | ⊚ | 1.00 | 1.02 |
| Example 12 | ⊚ | ⊚ | 1.01 | 1.01 |
| Example 13 | ⊙ | ⊙ | 1.01 | 1.00 |

TABLE 6

| | Quality of deinked pulp | | |
|---|---|---|---|
| | Whiteness (%) | Residual ink area rate | Residual fatty acid |
| Comp. Example 8 | 48.9 | 0.475 | None |
| Comp. Example 9 | 47.9 | 0.501 | None |
| Example 4 | 52.6 | 0.072 | None |
| Example 5 | 52.2 | 0.092 | None |
| Example 6 | 52.4 | 0.094 | None |
| Example 7 | 52.6 | 0.089 | None |
| Example 8 | 51.9 | 0.101 | None |
| Example 9 | 51.6 | 0.117 | None |
| Example 10 | 52.3 | 0.096 | None |
| Example 11 | 53.0 | 0.062 | None |
| Example 12 | 52.4 | 0.088 | None |
| Example 13 | 53.2 | 0.066 | None |

What is claimed is:

1. A liquid deinking composition consisting essentially of (a) a fatty acid mixture consisting essentially of 60 to 90 weight % of saturated fatty acids having 12 to 14 carbon atoms and 5 to 20 weight % of saturated fatty acids having 16 to 18 carbon atoms, (b) a nonionic surfactant with a hydrophilic-lipophilic balance of 2 to 12 in a proportion by weight of (a)/(b) of 5/95 to 40/60, and (c) 0 to 20 weight % of the composition of water.

2. A deinking composition as described in claim 1, wherein the nonionic surfactant (b) contains compounds obtained by a random-addition reaction or block-addition reaction or both of alkylene oxide having 2 to 4 carbon atoms with alcohols, amines or fatty acids, wherein said alcohols, amines or fatty acids have hydrogens activated for said addition reaction, or fatty esters thereof.

3. A deinking composition as described in claim 1, wherein the nonionic surfactant (b) contains alkylene oxide adducts of saturated or unsaturated, primary or secondary alcohols having 8 to 24 carbon atoms or alkylene oxide adducts of alkylphenols having 8 to 12 carbon atoms in the alkyl moieties, alkylene oxide adducts of saturated or unsaturated higher fatty acids having 10 to 24 carbon atoms, alkylene oxide adducts of saturated or unsaturated, primary or secondary amines having 8 to 36 carbon atoms, or alkylene oxide adducts of the mixtures of polyhydric alcohols having 2 to 10 hydroxyls and oils and fats in which the saturated or unsaturated fatty acid moieties have 8 to 24 carbon atoms.

4. A deinking composition as described in claim 1, wherein the proportion of (c) water is 5 to 20 weight %.

5. A deinking composition as described in claim 1, further containing 0.05 to 20 weight % of (d) a crystallization inhibitor.

6. A deinking composition as described in claim 5, wherein (d) is an ester of glycerine, diglycerine, or polyglycerine having 6 to 30 carbon atoms with saturated fatty acid having 12 to 22 carbon atoms or unsaturated fatty acid having 16 to 22 carbon atoms.

7. A deinking composition as described in claim 3, wherein the nonionic surfactant (b) is an alkylene oxide adduct of at least one compound selected from the group consisting of myristyl alcohol, cetyl alcohol, stearyl alcohol, $C_8$–$C_{12}$ alkylphenol, lauric acid, myristic acid, palmitic acid, stearic acid, arachic acid, behenic acid, palmitoleic acid, oleic acid, elaidic acid, linoleic acid, linolenic acid, erucic acid, ricinolic acid, ethylhexylamine, di-2-ethylhexylamine, laurylamine, dilaurylamine, tetradecylamine, stearylamine, distearylamine, oleylamine, dioleylamine, ethylene glycol, propylene glycol, glycerine, polyglycerine, sorbitol, sorbitan and sucrose.

8. A deinking composition as described in claim 1, wherein said nonionic surfactant (b) is RO(ethylene oxide)$_{20}$(propylene oxide)$_{20}$H or RCOO(ethylene oxide)$_{25}$(propylene oxide)$_{10}$H.

9. A deinking composition as described in claim 8, wherein R is a linear or branched alkyl group having from 8 to 24 carbon atoms.

10. A liquid deinking composition consisting essentially of (a) a fatty acid mixture consisting essentially of a small weight % of saturated fatty acids having 8 to 10 carbon atoms, 60 to 90 weight % of saturated fatty acids having 12 to 14 carbon atoms and 5 to 20 weight % of saturated fatty acids having 16 to 18 carbon atoms, (b) a nonionic surfactant with a hydrophilic-lipophilic balance of 2 to 12 in a proportion by weight of (a)/(b) of 5/95 to 40/60, and (c) 0 to 20 weight % of the composition of water.

11. A deinking composition as described in claim 10, wherein the nonionic surfactant (b) is an alkylene oxide adduct of at least one compound selected from the group consisting of myristyl alcohol, cetyl alcohol, stearyl alcohol, $C_8$–$C_{12}$ alkylphenol, lauric acid, myristic acid, palmitic acid, stearic acid, arachic acid, behenic acid, palmitoleic acid, oleic acid, elaidic acid, linoleic acid, linolenic acid, erucic acid, ricinolic acid, ethylhexylamine, di-2-ethylhexylamine, laurylamine, dilaurylamine, tetradecylamine, stearylamine, distearylamine, oleylamine, dioleylamine, ethylene glycol, propylene glycol, glycerine, polyglycerine, sorbitol, sorbitan and sucrose.

12. A deinking composition as described in claim 10, wherein said nonionic surfactant (b) is RO(ethylene oxide)$_{20}$(propylene oxide)$_{20}$H or RCOO(ethylene oxide)$_{25}$(propylene oxide)$_{10}$H.

13. A deinking composition as described in claim 12, wherein R is a linear or branched alkyl group having from 8 to 24 carbon atoms.

14. A liquid deinking composition as described in claim 10, wherein the weight % of saturated fatty acids having 8 to 10 carbon atoms is about 1%.

15. A liquid deinking composition consisting essentially of (a) a fatty acid mixture consisting of saturated fatty acids having 8 to 10 carbon atoms, 60 to 90 weight % of saturated fatty acids having 12 to 14 carbon atoms and 5 to 20 weight % of saturated fatty acids having 16 to 18 carbon atoms, wherein said fatty acid mixture has a melting point ranging from 10° to 50° C., (b) a nonionic surfactant with a hydrophilic-lipophilic balance of 2 to 12 in a proportion by weight of (a)/(b) of 5/95 to 40/60, and (c) 0 to 20 weight % of the composition of water.

16. A liquid deinking composition as described in claim 14 wherein the melting point of said fatty acid mixture is 20° to 45° C.

17. A liquid deinking composition consisting essentially of (a) a fatty acid mixture consisting essentially of a small weight % of saturated fatty acids having 8 to 10 carbon atoms, 60 to 90 weight % of saturated fatty acids having 12 to 14 carbon atoms and 5 to 20 weight % of saturated fatty acids having 16 to 18 carbon atoms, (b) a nonionic surfactant with a hydrophilic-lipophilic balance of 2 to 12 in a proportion by weight of (a)/(b) of 5/95 to 40/60.

* * * * *